United States Patent Office 3,189,595
Patented June 15, 1965

3,189,595
METAL COMPLEX DIES CONTAINING
2-DIBENZOFURANOL
Clemens Streck, Loudonville, N.Y., assignor to General
Aniline & Film Corporation, New York, N.Y., a corporation of Delaware
No Drawing. Filed Jan. 19, 1962, Ser. No. 167,433
2 Claims. (Cl. 260—146)

This invention relates to a new class of azoic dyes, and relates more particularly to azoic dyes employing as a coupler 2-dibenzofuranol of the formula:

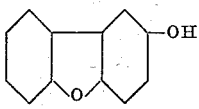

and to metallized ortho-ortho' type diazo dyes prepared by metallizing the product obtained when the ortho-ortho' configuration is present in the dyestuff produced by coupling the 2-dibenzofuranol with an azoic diazo compound.

It is an important object of this invention to provide a new class of dyes suitable for dyeing a very wide variety of materials; for example, natural fibers such as cotton and linen, animal fibers such as wool, silk or leather, and synthetic fibers such as nylon and the like.

A further object of the instant invention is the provision of a new class of azoic dyestuffs employing as a coupler 2-dibenzofuranol of the formula:

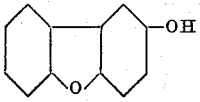

Another object of this invention is to provide a new class of metallized ortho-ortho' type diazo dyestuffs prepared from the product of a coupling reaction between a diazo compound which possesses the o-hydroxy-type configuration and 2-dibenzofuranol.

Other objects of this invention will be apparent from the following detailed description and the appended claims.

This compound, 2-dibenzofuranol, has been used previously in the manufacture of azo dyes; however, it has not been used heretofore as an azoic coupler. Prior uses of 2-dibenzofuranol as a coupler have been limited to production of dyestuffs having solubilizing groups in the final dye molecule. It has been unexpectedly found that a dyestuff formed from an azoic diazo, that is, a diazo compound free of sulfonic and carboxylic acid solubilizing groups, coupled with 2-dibenzofuranol produces unique shades of mustard, golds, tans and browns, previously available only through mixes. Additionally, such dyes have the unexpected advantage of being dischargeable and they, furthermore, have good fastness to light, washing and crocking for many uses.

The dyes of the instant invention may be produced in any of the well-known prior art methods. For example, a solution of the coupler may be mixed with a solution of the diazo compound and the coupling reaction allowed to occur in substance. However, it is preferred to produce the dye on the fiber itself. In practice, the fiber is impregnated with 2-dibenzofuranol and the dye developed on the fiber by treating with freshly prepared diazo, or a Fast Color Salt, i.e., a diazo compound which in some cases is sufficiently stable per se, but more often is stabilized by treatment with inorganic salts, e.g., zinc chloride, stannous chloride, ferric chloride, cupric chloride, cobaltous chloride, boron fluoride, and the like, or may be stabilized by treatment with arylsulfonic acids, e.g., naphthalenedi and tri-sulfonic acids, and the like.

The conventional azoic diazos are well known in the art. They are characterized by their freedom from the usual solubilizing groups, such as sulfonic and carboxylic acid groups. Included among the amines, from which such diazos are produced, are aromatic and heterocyclic amines such as Anilines
Xenylamines
Naphthylamines
Benzidines
Aminocarbazoles
Aminofuranes
Aminothiazoles
Aminoarylsulfones
Aminodiphenyl ethers
Aminobenzophenones
Aminofluorenones
Aminoazo compounds and the like. As specific examples of suitable amines, there may be mentioned Aminoazotoluene
4-chloro-2-nitroaniline
Ortho- and para-toluidine
5-chloro-o-toluidine
4- and 5-nitro-o-toluidine
2,5-dichloroaniline
Meta-chloroaniline
4-benzoylamino-2,5-diethoxyaniline
4-nitro-o-anisidine
4-chloro-o-anisidine
Ortho- and para-phenetidine
1-aminonaphthalene
1-aminoanthraquinone
Dianisidine
5-chloro-4-nitro-o-anisidine
5-diethylsulfamyl-o-anisidine
6-amino-2-methylbenzothiazole
1-aminocarbazole
4-aminobenzophenone
4-aminodiphenylsulfone
2,6-dichloro-p-phenylenediamine
Benzidine
4,4'-diaminostilbene
4-anilino-o-anisidine
2-(p-chlorophenoxy)-5-chloroaniline
2-chloro-5-trifluoromethylaniline
4-(p-nitrophenylazo)-2,5-dimethoxyaniline
4 - (4 - amino-2,5-dimethoxyphenylazo)-2,5-dimethoxyaniline
4-cyano-2,5-dimethoxyaniline
3-chloro-o-toluidine hydrochloride
4-(4-nitro-2,6-dichlorophenylazo)-2,5-dimethoxyaniline and the like.

The new dyestuffs of the instant invention may be structurally represented by the following general formula:

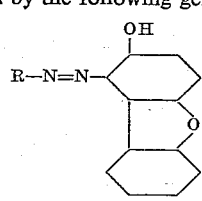

wherein R stands for a radical of an azoic diazo compound.

According to a modification of the instant invention, metallized dyestuffs having improved fastness properties may be formed from azoic dyes having an ortho-ortho' type of configuration, wherein, in the ortho-position to the diazotizable amine group, a metallizable hydroxy or lower alkoxy group is present. The azoic diazo compound is coupled with 2-dibenzofuranol and the resulting dye is metallized by treatment with a metallizing agent such as copper, cobalt, nickel, and the like, according to any of the well-known processes. Metallization may be carried out in substance, or on the fiber, for example, dyed material may be treated with a metal salt in a slightly acidic medium at an elevated temperature, or the same may be treated with a metal salt in a slightly alkaline medium at an elevated temperature in the presence of a chelating agent such as ammonium hydroxide, acetic acid, hydroxy and amino carboxylic acids, e.g., lactic acid, tartaric acid, salicyclic acid, orthoaminopropionic acid, ethylene-bisaminotetracetic acid, and the like.

Metallized dyestuffs, in accordance with the above modification, may be structurally represented by the following general formula:

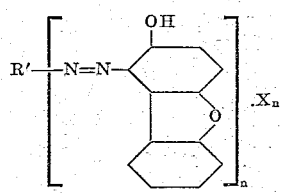

wherein R' stands for the radical of an azoic diazo compound bearing a metal complex forming group, such as a hydroxy or lower alkoxy group, in the ortho-position to the diazotized amino group, and $x$ represents a metal, and $n$ is an integer of 1 to 2.

The instant invention is further illustrated by the following examples, which are not intended to be in any way limitative.

*Example 1*

The dye of the formula:

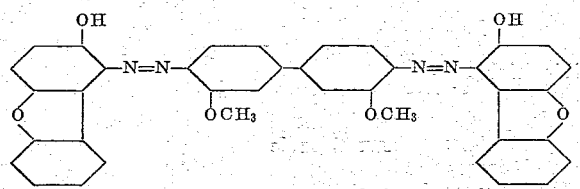

is prepared as follows:

A padding solution is made up by combining 2.0 grams of 2-dibenzofuranol, 1.6 grams of caustic soda flakes, and 3.0 grams of salt and adding water to 133 cc. Mercerized, bleached muslin is padded therewith and then dried.

A developing solution is made up of 5.0 grams of dianisidine tetrazotized and stabilized with zinc chloride, 2.0 grams of sodium citrate and 0.5 gram of monosodium phosphate made up to 133 cc. with water. The cotton is padded therewith, then passed through a 0.5% sodium bicarbonate solution at 160° F., rinsed, soaped as usual, and dried. The cotton is dyed a deep brown shade.

*Example 2*

The dye of the formula:

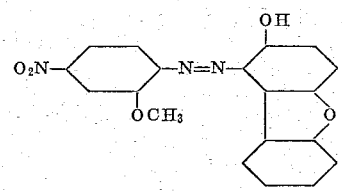

is prepared as follows:

Mercerized, bleached muslin is padded with coupling solution as in Example 1. A developing solution is prepared consisting of 7.0 grams of 4-nitro-o-anisidine diazo stabilized with zinc chloride, 0.5 gram of acetic acid 50%, and water up to 133 cc. The cotton is padded with this solution, passed through a 0.5% sodium bicarbonate solution at 160° F., rinsed, soaped as usual, and dried to produce an excellent brown dyeing.

*Example 3*

The dye of the formula:

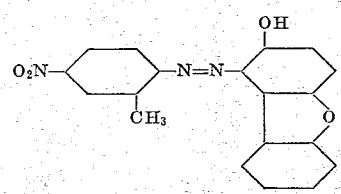

is prepared as follows:

A developing solution is prepared consisting of 7.0 grams of 4-nitro-o-toluidine diazo stabilized with boron fluoride and 0.5 gram of acetic acid 50% made up to 133 cc. with water.

Mercerized, bleached muslin, padded as in Example 1 with coupler solution, is padded with this developing solution, passed through a 0.5% sodium bicarbonate solution at 160° F., rinsed, soaped as usual, and dried. The cotton is dyed a good reddish brown shade.

*Example 4*

The dye of the formula:

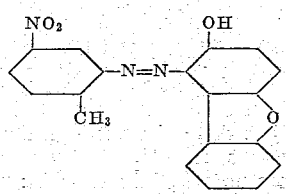

is prepared as follows:

Muslin is dyed as in Example 3, with the exception that the 4-nitro-o-toluidine is substituted by 5-nitro-o-toluidine. The muslin is dyed a good reddish tan shade.

*Example 5*

The dye of the formula:

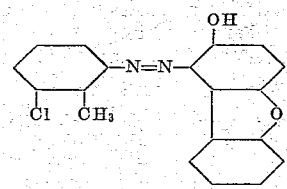

is prepared as follows:

Mercerized, bleached muslin is impregnated with coupling component as in Example 1.

1.6 grams of 3-chloro-o-toluidine hydrochloride is diazotized in the usual manner and neutralized. 0.5 gram of acetic acid is added and the solution made up to 133 cc. with water. Cotton is padded in the solution of diazo. The material is then passed through a 0.5% sodium bicarbonate solution at 160° F., rinsed, soaped as usual, and dried. The muslin is dyed a good reddish tan shade.

*Example 6*

The dye of the formula:

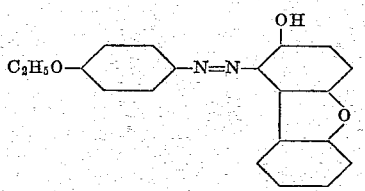

is prepared as follows:

Muslin is dyed as in Example 5, with the exception that 1.02 grams of para-phenetidine is substituted for the 1.6 grams of 3-chloro-o-toluidine hydrochloride. The muslin is dyed a good gold shade.

Example 7

The dye of the formula:

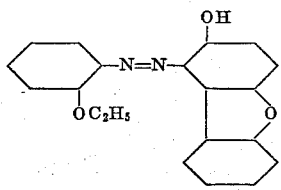

is prepared as follows:

Muslin is dyed as in Example 5, with the exception that 1.02 grams of ortho-phenetidine is substituted for the 1.6 grams of 3-chloro-o-toluidine hydrochloride. The cotton is dyed a tan shade.

Example 8

The dye of the formula:

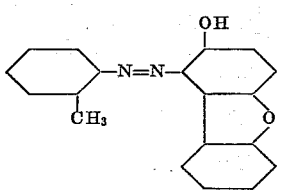

is prepared as follows:

Muslin is dyed as in Example 5, with the exception that 0.9 gram of ortho-toluidine is substituted for the 1.6 grams of 3-chloro-o-toluidine hydrochloride. A gold shade results.

Example 9

The dye of the formula:

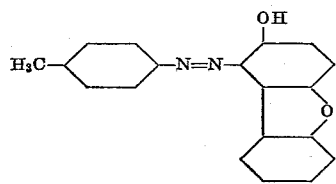

is prepared as follows:

Muslin is dyed as in Example 5, with the exception that 0.9 gram of para-toluidine is substituted for the 1.6 grams of 3-chloro-o-toluidine hydrochloride. A tan shade results.

Example 10

The dye of the formula:

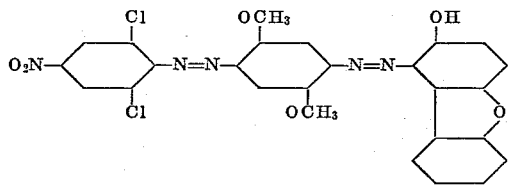

is prepared as follows:

Muslin is dyed as in Example 5, with the exception that 12.0 grams of 4-(4-nitro-2,6-dichlorophenylazo)-2,5-dimethoxyaniline is substituted for the 1.6 grams of 3-chloro-o-toluidine hydrochloride, and the 0.5 gram of acetic acid 50% is replaced by 10 grams of acetic acid 50%. A dark brown coloration is obtained on the fiber.

Example 11

The dye of the formula:

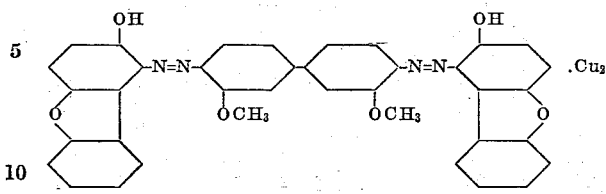

is prepared as follows:

A metal containing solution is made by dissolving 25 grams of tartaric acid in 120 cc. of water. To this solution is added 25 grams of copper chloride, 75 cc. of caustic soda 34° Bé., and made up to 250 cc. with water.

A piece of cotton muslin, dyed as in Example 1, is treated in 5 grams of the above metal containing solution in 123 cc. of water for 10 minutes at 160° F., rinsed, after-treated as usual and dried. The dark brown shade changed to a black-brown shade having better fastness to light.

Example 12

The dye of the formula:

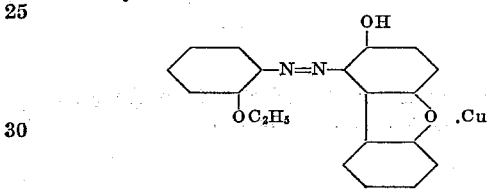

is prepared as follows:

A piece of cotton dyed according to the method of Example 7 is treated with a copper solution as per Example 11. The gold color of the original dyeing is changed to a darker brown, having improved fastness to light.

Example 13

The dye of the formula:

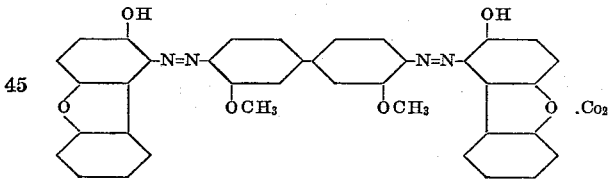

is prepared as follows:

Example 11 is repeated, except that the 25 grams of copper chloride is replaced by 25 grams of cobalt chloride. A darkening of shade results, having improved fastness to light.

Example 14

The dye of the formula:

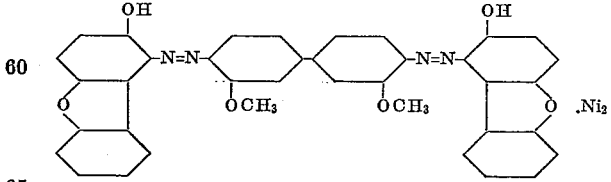

is prepared as follows:

Example 11 is repeated, except that the 25 grams of copper chloride is replaced by 25 grams of nickel chloride. A commensurate shade darkening accompanied by improved light fastness results.

Example 15

A Rapidogen solution is made up which consists of 11 grams of dianisidine tetrazotized and stabilized with methyl taurine, 10 grams of 2-dibenzofuranol, 10 grams of sodium hydroxide (100%), the usual solvents, and water made up to 120 parts.

A copper solution is made up which contains 147 parts of copper sulfate, 683 parts of water, 110 parts of triethanolamine and 60 parts of dry caustic.

The Rapidogen solution is combined with 50 parts of the copper solution and 30 parts of diethylene glycol. This solution is thickened to printing consistency with gum tragacanth. Cotton is printed with this, steamed in acid steam in a normal manner for 2 minutes, rinsed and dried. A black-brown dyeing of good fastness to light results.

Having described my invention, what I desire to secure by Letters Patent is:

1. A metalized complex azo compound having the formula:

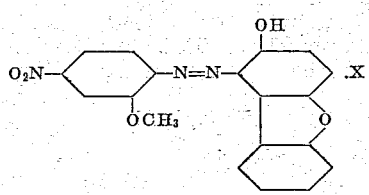

wherein X represents a metal selected from the group consisting of copper, cobalt and nickel.

2. A metalized complex azo compound having the formula:

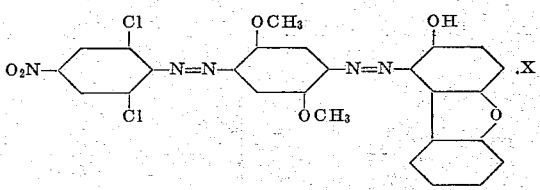

wherein X represents a metal selected from the group consisting of copper, cobalt and nickel.

References Cited by the Examiner

UNITED STATES PATENTS 2,128,508  8/48  Stusser et al. _____ 260—152
2,138,553  11/38  Muth et al. _____ 260—152

FOREIGN PATENTS 1,086,370  8/60  Germany.

OTHER REFERENCES

Gilman et al.: "Journal of Am. Chem. Soc.," vol. 61, November 1939, pages 3146–3148.

Gilman et al.: "Journal of Am. Chem. Soc.," vol. 68, 1946, pages 426–428.

CHARLES B. PARKER, *Primary Examiner.*

LEON ZITVER, *Examiner.*